United States Patent [19]

Kawasaki et al.

[11] Patent Number: 4,811,320

[45] Date of Patent: Mar. 7, 1989

[54] OPTICAL TYPE PICKUP APPARATUS WITH LENS HOLDER SUPPORTED BY FRAME WIRES EACH HAVING AN END INSERTED INTO A FRAME HOLE

[75] Inventors: Ryoichi Kawasaki, Gunma; Masami Shimizu, Ota; Kozo Suzuki, Gunma; Noriyoshi Oyama, Gunma; Tomio Uchida, Gunma, all of Japan

[73] Assignee: Sanyo Electric Co., Ltd., Moriguchi, Japan

[21] Appl. No.: 21,071

[22] Filed: Mar. 3, 1987

[30] Foreign Application Priority Data

Mar. 4, 1986 [JP] Japan .................................. 61-46792
Jul. 4, 1986 [JP] Japan ................................. 61-158436

[51] Int. Cl.$^4$ ......................... G11B 7/09; G02B 26/10
[52] U.S. Cl. ....................................... 369/45; 369/44; 350/6.3; 350/247; 350/255
[58] Field of Search ........................ 369/43–46, 369/112; 360/114; 350/247, 255, 6.3

[56] References Cited

U.S. PATENT DOCUMENTS

| | | | |
|---|---|---|---|
| 4,475,179 | 10/1984 | Geyer | 369/45 X |
| 4,547,871 | 10/1985 | Sugiyama et al. | 369/45 X |
| 4,568,142 | 2/1986 | Iguma | 369/45 X |
| 4,615,585 | 10/1986 | Van Sluys et al. | 369/45 X |
| 4,633,456 | 12/1986 | Luecke | 369/45 |
| 4,643,522 | 2/1987 | Takashima | 350/255 |
| 4,646,283 | 2/1987 | Ito et al. | 369/45 X |
| 4,658,390 | 4/1987 | Fujii et al. | 369/45 |
| 4,679,904 | 7/1987 | Kurihara | 350/6.3 X |

FOREIGN PATENT DOCUMENTS

| | | | |
|---|---|---|---|
| 57-18035 | 1/1982 | Japan | 369/44 |
| 57-71532 | 5/1982 | Japan . | |
| 57-133529 | 8/1982 | Japan | 369/44 |
| 57-127934 | 8/1982 | Japan . | |
| 58-111135 | 7/1983 | Japan | 369/45 |
| 60-76039 | 4/1985 | Japan | 369/45 |

Primary Examiner—Alan Faber
Assistant Examiner—W. R. Young
Attorney, Agent, or Firm—Armstrong, Nikaido, Marmelstein & Kubovcik

[57] ABSTRACT

A optical type pickup apparatus wherein the center of gravity of the lens holder coincides with the action point of the resultant force of the forces to be produced by the control signals input into the driving coil and by the magnetic field of the magnetic circuit. Thus, this apparatus may be provided which is capable of a signal reading operation wherein the lens holder is not out of shape even if the lens holder is driven in the focusing direction and the tracking direction. The present invention is capable of reading the signals from the signal record medium and advantageous in making the apparatus smaller, because the combination between the lens holder and each of a plurality of wires is kept away by a given amount from the end secured to the frame of the wire from the mid-point position between both the ends of the frame to control the inclination when the lens holder has moved in the focusing direction and the tracking direction to normally render the posture of the objective lens proper with respect to the disc face.

3 Claims, 2 Drawing Sheets

OPTICAL TYPE PICKUP APPARATUS WITH LENS HOLDER SUPPORTED BY FRAME WIRES EACH HAVING AN END INSERTED INTO A FRAME HOLE

BACKGROUND OF THE INVENTION

The present invention relates to an optical type of pickup apparatus for optically reading the signals recorded on the signal reading medium and particularly an optical type of pickup apparatus which controls the posture of the objective lens.

There are apparatuses which read the signals from the signal recording medium using an optical type pickup apparatus. A DC player is one of many of these types of apparatuses. The CD player reproduces digital signals formed on the signal faces of the compact discs (CD) which have projections called pit. The CD player must control the optical beam in the optical axis direction, the so-called focusing direction, using a focusing control operation to correctly converge the optical beam on the signal face on the disc. The optical beam is produced from the optical type pickup apparatus. Also, it is necessary to perform a tracking controlling operation for controlling the optical beam in the radial direction of the disc, the so-called tracking direction, to cause the optical beam to follow the signal track on the disc.

Normally an optical-type pickup apparatus has an objective lens disposed within a lens holder. A tracking coil and a focusing coil are wound on the lens holder. Control signals are input to the tracking coil and the focusing coil in order to perform tracking control and focusing control. Thus, the optical type pickup apparatus was required to support the lens holder so that it might freely move in the tracking direction and the focusing direction in accordance with the input control signals.

Shown in FIG. 1 of Japanese Laid-Open Patent Application Tokkaisho No. 57-127934 Publication is an example of an optical type pickup apparatus as described hereinabove. A support member, composed of viscometric elastic member, supported the driven member as the lens holder. As the support member was elastic, torsion was caused by the force to be applied in the axial direction of the support member so that the posture of the lens holder could not be retained properly.

Also, a cantilever type support apparatus was conventionally known wherein, for example, four steel wires were disposed in parallel with one end of the steel wire being secured to the frame and the other end thereof being secured to the lens holder. The cantilever type apparatus using the steel wire, did not have elasticity in the axial direction as the steel member. The support apparatus of this type had an advantage because the posture of the lens holder could be kept with respect to the force to be applied in the axial direction.

However, the cantilever type of support apparatus using the steel material (wire) had to retain the weight of the lens holder only with the wire. If the wire is made thicker to increase its strength, stiffness of the wire becomes larger, and the resonance frequency of the wire becomes higher. Thus, the device is vulnerable to vibration. Due to the unbalance of the driving force, the support position of the lens holder, during the tracking controlling or the focusing controlling, was concentrated on the single side of the lens holder so that a rolling operation (rolling) was caused. Thus, the correct posture could not be retained.

SUMMARY OF THE INVENTION

An essential object of the present invention is to provide an optical type pickup apparatus which can eliminate the disadvantages inherent in the conventional ones. The present invention is provided with an optical type of pickup apparatus which has a plurality of wires extended between both ends of a frame. One end of each wire is secured to the frame and the other end of the wire is inserted into a hole drilled in the frame. A lens-holder retains the objective lens. The lens-holder is connectd with each of the plurality of wires in the portion away from the end of the wire, which is secured to the frame from a middle point between both ends of the frame. Accordingly, the respective connection points between the plurality of wires and the lens holder are kept away by the given amount from the end of the wire secured to the frame from the middle position between both ends of the frame so that the objective lens is controlled in inclination when the lens holder has been moved in the focusing direction and the tracking direction.

According to another embodiment of the present invention, the optical type of pickup apparatus comprises a magnetic circuit for forming a magnetic field. A lens holder is disposed in the magnetic field of the magnetic circuit and has the objective lens retained therein. A driving coil is wound on the lens holder so that the lens holder may be driven in a given direction in the magnetic field of the magnetic circuit by control signals. The center of gravity of the lens holder and an action point of the resultant force of the force to be produced by the control signals in the magnetic field of the magnetic circuit and the driving coil are caused to coincide each other. Accordingly, the center of gravity of the lens holder coincides with the action pint of the resultant force of the force caused by the control signals in the magnetic field formed by the magnetic circuit and the driving coil to prevent the lens-holder rolling from being caused.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
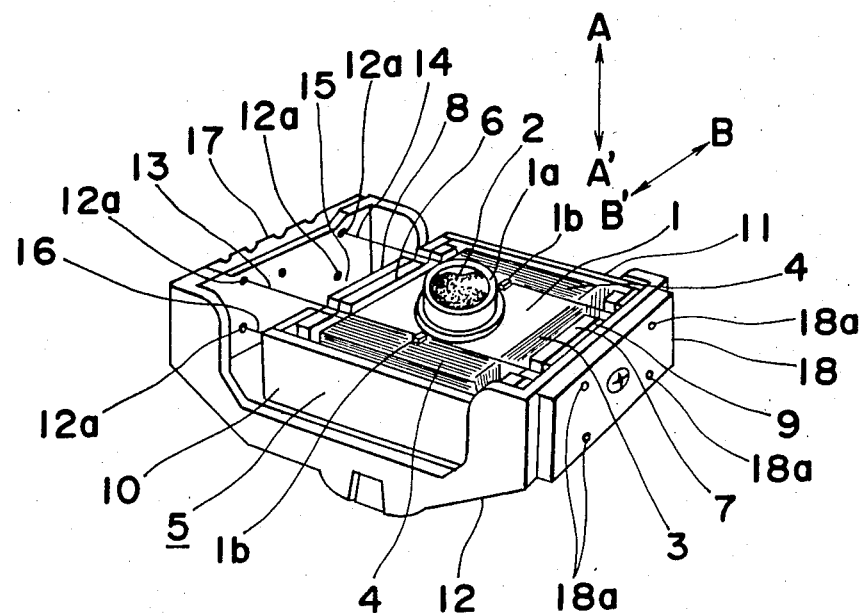
FIG. 1 is a perspective view showing one embodiment of the present invention.

Before the description of the present invention proceeds,it is to be noted that like parts are designated by like reference numerals throughout the accompanying drawings.

Referring now to the drawings, there is shown in FIG. 1 an electric mechanical transducer according to the embodiment of the present invention. A lens holder 1 is provided with an objective lens 2 within an integrally molded cylinder 1a. Focusing coils 3 are engaged with the lens holder 1. Tracking coils 4 are also engaged with the lens holder 1. A magnetic circuit 5, which forms the magnetic field, is composed of a pair of permanent magnets 6, 7, having disposed thereon yokes 8, 9. The plates 10, 11 extend between the yokes 8, 9. A frame 12 has the magnetic circuit 5 mounted thereon. Wires 13 through 16 are used to support the lens holder 1 on the frame 12. A print base plate 17 fixes one end of the wires 13 through 16. A hole member 18 has holes 18a, into which the other ends of the wires 13 through 16 are inserted.

The lens holder 1 has a plurality of holes drilled from the top. The cylinder 1a, with the objective lens 2 being supported inside, is formed as shown in the partial sectional view of FIG. 2. The hole 18a is gradually narrowed from the opening to the rear and is closed without being extended. The holes are symmetrically provided with respect to the cylinder 1a centrally formed. Thus, the lens holder 1 is deviated downward in its center of gravity from the center of the holder. The lens holder 1 is thus adapted to have a lower center of gravity with the objective lens 2 being engaged with the cylinder 1a.

Figure 2:
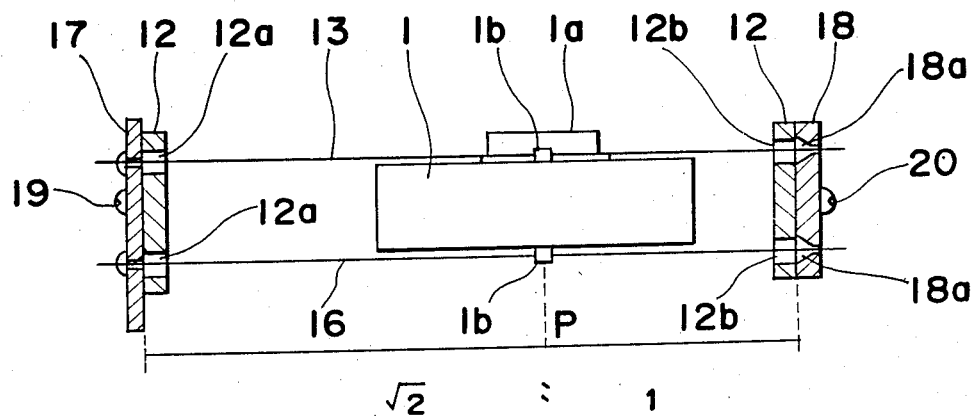
FIG. 2 is an abbreviated view of the section showing the mounting condition of the wire.

However, the print base plate 17 is fixed to the frame 12 with screws 19 as shown in FIG. 2. Each one end of the wires 13 through 16 extends through holes 12a of the frame 12 and each is fixedly soldered to the print base plate 17. Also, the hole member 18 is secured to the frame 12 with screws 20. The other ends of the wires 13 through 16 are extended into the holes 12b, which are filled with the dump material of the frame 12, and are inserted into the holes 18a of the hole member 18.

Figure 3:
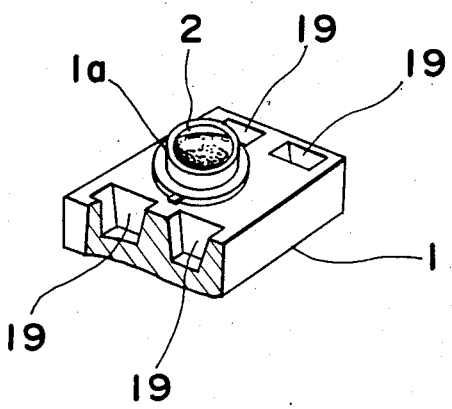
FIG. 3 is a perspective view showing the engagement condition of the focusing coil and the tracking coil with the lens holder.

The focusing coil 3 and the tracking coil 4 are engaged with the lens holder 1. As shown in FIG. 3, the focusing coil 3 is wound to surround the side face of the lens holder 1. The tracking coil 4 is wound by two, grasping the objective lens 2 so that the tracking coil may go round to the reverse face from the front face of the lens holder 1 and return to the front face again.

Figure 4A:
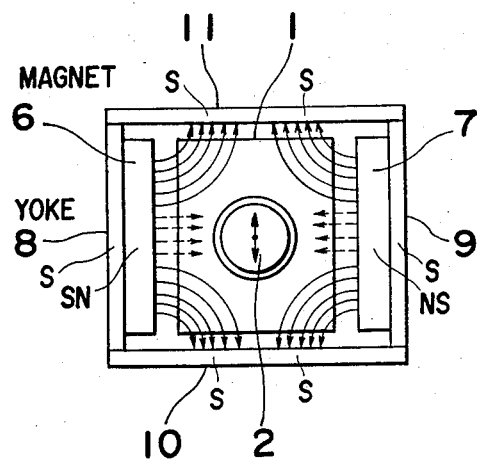
FIGS. 4(a) and 4(b) are model views each being a plan and a side showing the direction of the magnetic flux of the magnetic circuit.

When the optical type of pickup apparatus constructed, as described hereinabove, is assembled, the lens holder 1, engaged with the focusing coil 3 and the tracking coil 4, is disposed in the given position of the magnetic circuit 5. Thereafter, the wires 13 through 16, which are fixedly soldered at the respective one ends of the print base plate 17, are inserted into the holes 12a of the frame 12 from the outside of the frame 12. The wires are inserted into the holes of the mounting portion 1b of the lens holder 1, and are thereafter inserted into the holes of the frame 12 and into the holes 18a of the hole member 18. The mounting portion 1b of the lens holder 1 is bonded with the wires 13 through 16 to complete the assembling operation. At this time, the lens holder 1 is bonded with the wires 13 through 16 so that the position of the mounting portion 1b of the lens holder 1 may conform to the mid-point P, where the distance from the print base plate 17 to the hole member 18 is in a ratio of 2:1. The numeral value of the mid-point of the above described 2:1 ratio shows the position of the largest amount of flexible relative to the load. The flexibility being determined through the analysis of the bending moment of the device with one end being rigidly spliced (fixed), the other end being softly spliced (supported for free movement). The focusing coil 3 has two parallel faces provided opposite to the pole-faces having the N polarities of the permanent magnets 6, 7. The tracking coil 4 has the portions, which are adhered on the side face of the lens holder 1, respectively provided opposite to the pole-faces of the permanent magnets 6, 7 having the N polarities. Also, the plates 10, 11 are connected with the pole-faces of the permanent magnets 6 and 7 having the S polarities through the yokes 8, 9, so that the magnetic circuit 5 causes the magnetic fluxes shown by the arrows of the solid lines and the broken lines of FIGS. 4(a) and 4(b), which show the model plan and side views of the optical type pickup of FIG. 1. Thus, the objective lens 2, retained on the lens holder 1, may be driven in the focusing direction and the tracking direction in accordance with the control signals input into the focusing coil 3 and the tracing coil 4. Namely, in the portions opposite to the respective pole-faces of the permanent magnets 6 and 7 of the focusing coil 3, the control signals flow in the upper, and lower directions in FIG. 4(a). The magnetic circuit 5 is to produce the magnetic flux in the arrow direction of the broken-line in FIG. 4(a) with respect to the focusing coil 3 from the central vicinity of the permanent magnets 6, 7. The lens holder 1 is adapted to move in the focusing direction onto one or the other side (the arrow A—A' direction in FIG. 1) in FIG. 4(a). The circular magnetic flux to be produced from the magnetic circuit 5 shown by the solid line of FIG. 4(a) does not influence the movement of the lens holder 1 if the control signals do not flow (are not input) to the focusing coil 3. Namely, when the magnetic flux is directed at the plate 10 from, for example, the permanent magnet 6 in the adjacent side-face of the lens holder 1, the relation of the current between the magnetic flux and the current input into the focusing coil 3 reverses, so that equal forces, which are mutually opposite in direction, are applied upon the lens holder 1 by the magnetic flux. This is also true for the magnetic fluxes in the respective directions shown in the solid lines of FIG. 4(a).

Figure 4B:
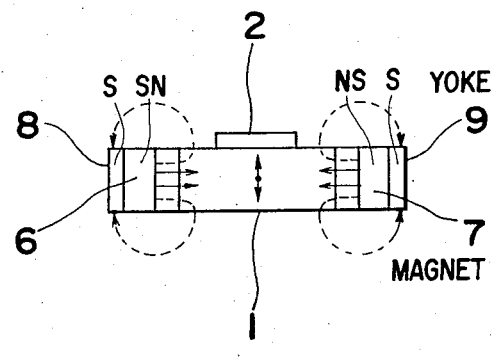

On the other hand, in the portions opposite to the respective pole-faces of the permanent magnets 6, 7 of the tracking coil 4, the central signals flow in the upper, and lower directions as shown in FIG. 4(b). The magnetic circuit 5 is to cause the magnetic fluxes in the arrow directions of the solid lines and the broken lines of FIG. 4(b), so that the lens holder 1 is to move in the tracking direction onto one or the other side (the arrow B—B' direction in FIG. 1) in FIG. 4(b). Accordingly, the proper control signals are input into the focusing coil 3 and the tracking coil 4 so that the objective lens 2, retained on the lens holder 1, may be driven into the desired position.

The mounting portions 1b, which are portions to be connected with the wires 13 through 16 of the lens holder 1, are formed in the central-portion position on the side in the direction along which the wires 13 through 16 of the lens holder 1 are extended. The portions 16 are formed by four portions which are symmetrical with respect to the center of the lens holder 1. The support point, which becomes the central point of the respective combination points of the wires 13 through 16, is located at the center of the lens holder 1. Also, the focusing coil 3 and the tracking coil 4 are wound in the lens holder 1, the focusing coil 34 is wound to surround the side face of the lens holder 1, the tracking coil 4 is wound by two to grasp the objective lens 2 so that it may turn to the rear face from the front face of the lens holder 1 and return again. In this case, the focusing coil 3 and the tracking coil 4 are symmetrical in face with respect to the imaginary face to be formed through the connection of the four mounting portions 1b of the lens holder. Also, the magnetic circuit 5 has permanent magnets 6, 7, yokes 8, 9, and plates 10, 11 disposed so that the facing symmetrical magnet field may be produced with respect to the imaginary face. Thus, the operation point of the resultant forces of the force to be produced by the magnetic field of the magnetic circuit 5 and the control signals input into the focusing coil 3 and the tracking coil 4 are considered to be in the focusing direction and the tracking direction and to be positioned at the center of the lens holder 1. Namely, the center of gravity, the support point, and the action point conform to one another at the center of the lens holder 1. Accordingly, the lens holder is not out of shape even if the lens holder 1 is driven in the focusing direction and in the tracking direction to control the focus of the light beam, so that the objective lens 2 retains the proper posture with respect to the signal face.

Figure 5:
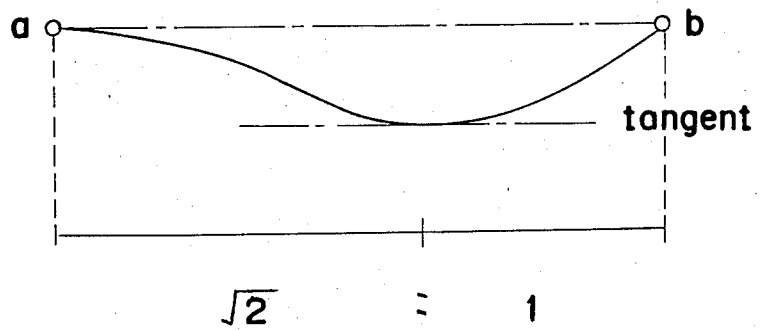
FIG. 5 is a view for showing how the wire is bent.

The wires 13 through 16, which are made of, for example, phosphorous-bronze line material, are not elastic in the axial direction, but elastic in the direction vertical to the shaft. Since the wires 13 through 16 are not secured on one side by being inserted into the holes of the frame 12 and on the other side by being inserted into the hole member 18, they slide within the holes of the frame 12 and the hole member 18 when the lens holder 1 moves in the focusing direction and the tracking direction, so that the movement of the lens holder 1 is correctly performed. On the other hand, the respective one-ends on the same side of the wires 13 through 16 are fixedly soldered to the print base plate 17 secured to the frame 12. As the wires 13 through 16 are different in the method of connecting the respective ends, the drag to be produced by the movement of the lens holder 1 is different. However, since the connection point of the lens holder 1 to the wires 13 through 16 is conformed to the mid-point, where the distance between both ends of the frame 12, i.e., the distance from the print base plate 17 to the hole member 18 is a ratio of 2:1 with the connection method of the wire 13 through 16 being taken into consideration, the horizontal condition of the lens holder 1 is retained, if the lens holder 1 is moved in the focusing direction and the tracing direction, to retain the horizontal condition of the objective lens 2. Namely, as graphically shown in FIG. 5, where the flexing method of the wire with one end a being rigidly spliced, the other end b being softly spliced, the tangent with the flexible amount of the wire (shown by an experiment) is largest (where the distance is divided by the 2:1 towards the end of the soft connection from the end of the rigid connection) is always horizontal. The position of the mounting portion 1b of the lens holder 1 is a point where the wires 13 through 16 becomes largest in the flexible amount. The mounting portion 1b is formed on the central line of the lens holder 1 with respect to the axial direction of the wires 13 through 16 and is formed in a position symmetrical to the center of the lens holder 1. Thus, the lens holder 1 is balanced by the wires 13 through 16.

As is clear from the foregoing description, according to the arrangement of the present invention, the center of gravity of the lens holder conforms to the action point of the resultant force of the forces to be produced by the control signals input into the driving coil and by the magnetic field of the magnetic circuit, so that an optical type pickup apparatus may be provided which is able to perform a signal reading operation in which the lens holder is not out of shape even if the lens holder is driven in the focusing direction and the tracking direction.

Also, the present invention is able to read the signals from the signal record medium. The present invention is advantageous by making the apparatus smaller, because the lens holder and each of a plurality of wires are kept at a distance by a given amount from the end secured to the frame of the wire from the mid-point position between both ends of the frame to control the inclination when the lens holder has moved in the focusing direction and the tracking direction to normally render the posture of the objective lens proper with respect to the disc face.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

We claim:

1. An optical type pickup apparatus wherein optical beams for a signal reading operation are focused onto a signal face of a record medium by driving an objective lens, said optical type pickup apparatus comprising:
   a plurality of wires extended between both ends of a frame with a first end of each wire being secured to the frame, a second end of each wire being inserted into a hole drilled in the frame; and
   a lens holder retaining the objective lens and connected with each of the plurality of wires so as to be supported by said frame, said lens holder being connected with each of said plurality of wires in a position away from the first end of the wire secured to the frame from a mid-point position between both ends of said frame.

2. An optical type pickup apparatus wherein optical beams for a signal reading operation are focused onto a signal face of a record medium by driving an objective lens, the optical type pickup apparatus comprising:
   a frame;
   a plurality of wires extending between both ends of the frame, a first end of each wire being secured to the frame, a second end of each wire being inserted into a hole drilled in the frame;
   a magnetic circuit forming a magnetic field;
   a lens holder disposed in the magnetic field of said magnetic circuit, said lens holder having said objective lens retained therein, said lens holder being connected with each of said plurality of wires to be supported by said frame; and
   a driving coil wound around said lens holder so that said holder might be driven in a direction driven by the magnetic field of said magnetic circuit through use of control signals.

3. An optical type pickup apparatus according to claim 1, further comprising:
   a magnetic circuit forming a magnetic field;
   said lens holder being disposed in the magnetic field of said magnetic circuit, said lens holder being provided with holes for adjusting a position of a center of gravity of said lens holder; and
   a driving coil wound around said lens holder so that said lens holder may be driven in a direction driven by the magnetic field of said magnetic circuit through input of control signals, wherein the center of gravity of said lens holder coincides with an action point of a resultant force of a force produced by the magnetic field of said magnetic circuit and the control signals in said driving coil.

* * * * *